US000001014H

United States Statutory Invention Registration [19]

[11] Reg. Number: H1014

Kraut et al.

[43] Published: Jan. 7, 1992

[54] METHOD OF MAKING CHERRIES OF MARASCHINO TYPE

[75] Inventors: Charles W. Kraut, Mt. Zion; Michael E. Augustine, Decatur, both of Ill.

[73] Assignee: A. E. Staley Manufacturing Company, Decatur, Ill.

[21] Appl. No.: 439,225

[22] Filed: Nov. 20, 1989

Related U.S. Application Data

[63] Continuation-in-part of Ser. No. 307,874, Feb. 7, 1989, abandoned, which is a continuation-in-part of Ser. No. 187,618, Apr. 28, 1988, abandoned.

[51] Int. Cl.[5] ..... A23L 1/27

[52] U.S. Cl. ..... 426/250; 426/269; 426/540; 426/639

[58] Field of Search ..... 426/102, 103, 639, 321; 127/31

[56] References Cited

U.S. PATENT DOCUMENTS

| | | | |
|---|---|---|---|
| H621 | 4/1989 | Day | 426/592 |
| 819,286 | 5/1906 | Kiefer | 426/639 |
| 2,499,375 | 3/1950 | Erickson | 426/639 |
| 3,307,954 | 3/1967 | Blahemore | 426/639 |
| 3,883,365 | 5/1975 | Forsberg et al. | 127/60 |
| 3,928,062 | 12/1975 | Yamauchi | 127/60 |
| 4,115,595 | 9/1978 | Jordan | 426/102 |
| 4,156,023 | 5/1979 | Jesrsen et al. | 426/639 |
| 4,199,374 | 4/1980 | Dwivedi et al. | 127/60 |
| 4,350,711 | 9/1982 | Kahn et al. | 426/102 |
| 4,379,171 | 4/1983 | Furda et al. | 426/291 |
| 4,465,698 | 8/1984 | Bussiere | 426/102 |
| 4,517,021 | 5/1985 | Schollmeier | 127/30 |
| 4,626,434 | 12/1986 | O'Mahoney | 426/639 |
| 4,643,773 | 2/1987 | Day | 127/30 |
| 4,789,558 | 12/1988 | Winkler et al. | 426/639 |

FOREIGN PATENT DOCUMENTS

| | | | |
|---|---|---|---|
| 117093 | 6/1943 | Australia | 426/639 |
| 569124 | 1/1959 | Canada | 426/639 |

OTHER PUBLICATIONS

G. G. Waters and J. G. Woodroof, Chapter 9., *Commercial Fruit Processing*, pp. 407–424 (J. G. Woodroof and B. S. Luh, eds., AVI Publ. Co., Westport, CT, 2 ed., 1986.

H. M. Pancoast et al., *Handbook of Sugars*, pp. 176–177 and 232–233.

*Primary Examiner*—John S. Maples
*Assistant Examiner*—Shean C. Wu

[57] ABSTRACT

A method of making cherries of the maraschino type is provided. Sulfite brined cherries are leached to reduce residual sulfur dioxide content to at most about 100 ppm. The leached cherries are then immersed in a sweetener syrup consisting essentially of high fructose corn syrup, solids from crystalline fructose, and a red coloring agent. The syrup has a sweetener solids content insufficient to cause substantial osmotic shock to said fruit, but said immersing raises the solids level of said cherry fruit and imparts thereto a red color. The use of the particular sweetener syrup allows the solids level of the fruit to be raised much faster than in conventional maraschino cherry manufacture and yet collapse of the fruit is avoided. Also provided is a method of packing frozen fruit.

5 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD OF MAKING CHERRIES OF MARASCHINO TYPE

CROSS-REFERENCE TO RELATED APPLICATIONS

This application is a continuation-in-part of Ser. No. 07/307,874, filed Feb. 7, 1989, which is a continuation-in-part of Ser. No. 07/187,618, filed Apr. 28, 1988, both now abandoned.

FIELD OF THE INVENTION

In one aspect, this invention relates to maraschino cherries. More particularly, this invention relates to a method of making maraschino cherries by infusion of sweetener solids.

BACKGROUND OF THE INVENTION

Maraschino cherries are an artificially colored and flavored fruit product made from whole cherry fruit. The harvested cherries are placed into a sulfur dioxide brine and held there until processed. The brine serves the dual function of bleaching the color from the fruit and of preserving the fruit until it is needed for processing.

The first step in processing is to remove sulfur dioxide from the fruit. This is generally accomplished by leaching the cherries in running water for a period of time to reduce the sulfur dioxide content to an acceptable level. Applied heat can also be used to speed the process, although this can be detrimental to final texture. Boiling water leaches have been used for this purpose. A residual sulfur dioxide level of 100 ppm or less is acceptable for proper color set in the cherry.

After leaching, the soluble solids level remaining in the cherries is generally quite low, in the range of 1° to 5° Brix. While there is some cherry flavor remaining, there is little left of the original fruit save for the form and structure. The next step in the process is to build the soluble solids level in the fruit to a level of about 40° Brix, and color the fruit at the same time to a uniform red color. Glacé cherries have soluble solids built to about 70%. This "sugaring" or "syruping" process is accomplished by immersing the fruit into a syrup for a period of time to allow the syrup solids to diffuse into the fruit. The prime concern at this point is to avoid shrinking or shrivelling of the fruit, which represents a yield loss.

To avoid yield losses, both the type of syrup used and its concentration are important. For cost reasons, a typical syrup used is composed of equal amounts of a high fructose corn syrup (HFCS) and a regular conversion corn syrup. The HFCS is used to provide sweetness while the regular corn syrup is present to provide body and texture.

SUMMARY OF THE INVENTION

This invention relates to a method of making cherries of the maraschino type comprising:

leaching sulfur compounds from brined cherry fruit with water to lower the residual sulfur dioxide level of said fruit to at most 100 ppm, and immersing said fruit after said leaching in a sweetener syrup consisting essentially of a high fructose corn syrup, solids from crystalline fructose and a red coloring agent, said syrup having a sweetener solids content insufficient to cause substantial osmotic shock to said fruit, and repeating said immersing in at least one more subsequent sweetener syrup having a higher sweetener solids content than said fruit after said first immersing, the cumulative effect of all said immersing steps being sufficient to raise the solids level of said fruit and impart thereto a red color.

It is thought that the carbohydrates from both sweeteners diffuse into the fruit, and that the monosaccharides would diffuse to a greater extent than the higher saccharides present in the regular corn syrup, simply from a molecular size standpoint. If the objective in this process is to build solids, the choice of a monosaccharide syrup is thus desirable.

DETAILED DESCRIPTION OF THE INVENTION

The following detailed description will describe in general the method of making maraschino type cherries of this invention and the frozen fruit packs more specifically described in the examples set forth below.

MARASCHINO TYPE CHERRIES

The method of this invention involves, as described above, two steps. The first step involves leaching of brined cherry fruit to lower the level of residual sulfur dioxide to 100 ppm at most. The second step involves immersion of the washed fruit in a sweetener syrup to build sweetener solids. These steps will be discussed in more detail below.

The first step of the method of this invention is the leaching of sulfur compounds from brined cherry fruit. By "cherry fruit", it is meant fruit having flesh in which the cellular structure has been maintained as opposed to finely comminuted (e.g., pulped) flesh. Thus, cherry fruit includes stemmed and pitted cherry fruit and fruit pieces, as well as whole cherry fruit.

The production of brined cherry fruit is extensively discussed by G. G. Waters and J. G. Woodroof in Chapter 9 or *Commercial Fruit Processing,* pp. 407–424 (J. G. Woodroof and B. S. Luh, eds., AVI Publ. Co., Westport, CT, 2 ed, 1986), the disclosure of which is incorporated herein by reference. In general, cherries are mechanically harvested and then immersed in a sulfite brine comprised of dissolved sulfur dioxide or sodium bisulfite (and, optionally, a calcium compound to make a calcium bisulfite a brine). The sulfite serves to preserve the cherry against deterioration by a variety of mechanisms, to bleach natural color from the cherry and to firm the tissue to withstand later processing. Brined cherries typically contain from about 2000 to about 6000 ppm of sulfur dioxide.

Cherries of the maraschino type, e.g., maraschino and glacé cherries, are prepared from sulfited cherries by leaching out the sulfur dioxide and then coloring with a certified dye. Leaching with water also removes other water-soluble components such as sugars, natural coloring matter, and flavor, leaving behind a firm, bleached ball consisting mostly of cellulose and pectin. The final process is a matter of coloring with a stable dye and adding flavor and sugar. The finished product is used chiefly for decorative purposes.

After the brining process is complete, the cherries are removed from the brine, then passed over a cluster breaker and through a mechanical stemmer. Cocktail cherries are not stemmed. After the stemmers, the cherries are passed to inspection tables where cherries are inspected visually for blemishes prior to the pitting operations. Chapter 2 of *Commercial Fruit Processing*, supra, has more information on pitting cherries, the disclosure of which is incorporated by reference. In the more modern, larger plants, electric sorters scan for cherries with discolorations, blemishes, and insufficient bleach and remove these from the processing line. Lightly blemished fruit is diverted to a secondary bleaching line for further treatment. Heavily blemished fruit is dyed, syruped, and finely chopped for ice cream mixes.

Cherries for maraschino manufacture are graded into sizes of 2-mm increments from 14 to 24 mm. The pitted, graded fruit is now ready for leaching and further processing. If the fruit is not to be used immediately, it scan be returned to the bisulfite brine. Total shrinkage from stemming, pitting, culling, and leaching may range from 22% to almost 35%. Losses vary according to the size and maturity of the cherry.

There can be many variations in the methods of leaching, dyeing, and syruping cherries. A processor may vary the procedure depending upon maturity, cultivar, and equipment available. Even the hardness of the water can affect the amount of acidulants necessary in some of the dyeing steps. Previously, by choosing a combination of dyes, a food processor could obtain the particular shade of red that he considered best for the final product. Now, however, these red dyes have been disallowed by the U.S. Food and Drug Administration (FDA) with the exception of Red No. 4 (Ponceau SX) which is limited to 150 ppm in the final product. Erythrosine dye is currently still generally recognized as safe (GRAS) by the FDA although it is considered by some manufacturers to be less desirable in that it does not impart a clear, deep red color to the cherry.

The following are general methods for bleaching, dyeing, and syruping.

Leaching

Stemmed and pitted cherries are typically soaked for 24–48 hrs. in running water to remove most of the sulfur dioxide. The fruit is then boiled in several changes of water until the desired tenderness is obtained and the sulfur dioxide content is below 100 ppm. The pH of the fruit should generally be around 3.5–4.0. (Cherries for fruit salad must be leached to a sulfur dioxde content of 20 ppm or below to prevent blackening of the tinplate of the can interior.) Fruit properly leached for erythrosine dyeing has a pH of 4.1–4.4. Other dyes are absorbed more evenly and maintain a bright color if the pH is more in the acid range, around 3.5–4.0. A food grade acid, typically citric acid, can be used to adjust to a more acid pH.

Dyeing

When the desired level of sulfur dioxide is reached, the cherries are covered with the fruit syrup containing dye. Usually, an initial syrup of 30% saccharides by dry solids is satisfactory. With fruit low in soluble solids, higher saccharide concentrations may cause the fruit to shrivel, which reduces the quality of the final product. All the dyes may be added to the first syryp, but with erythrosine, it is necessary to use new neutral syrup to keep fruit in the pH range of 4.1–4.4. When the dye has penetrated sufficiently, the syrup is acidified with citric acid to pH 3.6–3.9. Cherries are dyed with erythrosine when they are used for fruit salad or in any application where the dye must be set. Dye quantities vary depending upon individual requirements and variations in the degree of bleaching of the natural pigments.

Syruping

The saccharide syrup used in syruping comprises a high fructose corn syrup (HFCS) and a crystaline sweetener comprised of fructose. Of course, crystalline fructose is very soluble in water and so will not exist in crystalline form in the syrup, but is present as a crystalline solid prior to mixing with the HFCS. By "high fructose corn syrup" is meant a corn syrup containing at least about 40% fructose by weight of dry solids (d.s.), typically from about 40% to about 60% (e.g., the two most common HFCS are at a nominal 42% or 55% d.s. fructose).

High fructose corn syrups are items of commerce as disclosed by H. M. Pancoast et al., *Handbook of Sugars*, pp. 176–177 and 232–233. The Type A high fructose corn syrup referred to therein and having 42% d.s. fructose is the product of enzymatic isomerization of a glucose syrup that generally has from 5–8% higher saccharides (e.g., di-saccharides, tri-saccharides, and so on). The type B high fructose syrup contains 55% d.s. fructose and is typically obtained by chromatographic fractionation of the Type A syrup, but can be obtained by other means of fructose enrichment of a Type A syrup (e.g., crystallization of dextrose from a Type A syrup).

Crystalline fructose is also an item of commerce, but has historically been much less plentiful than corn syrups. The crystallization of fructose is disclosed in U.S. Pat. Nos. 3,883,365 (Forsberg et al.), 3,928,062 (Yamauchi), 4,199,374 (Dwivedi et al.), and 4,643,773 (Day). Crystalline fructose is to be distinguished from materials containing significant amounts of amorphous fructose or corn syrup by-products, e.g., the semi-crystalline fructose disclosed in U.S. Pat. No. 4,517,021 (Schollmeier). Crystalline fructose is available commercially at a purity in excess of 99.0% as the anhydrous crystalline form of beta D-fructose, for example KRYSTAR® brand crystalline fructose available from A. E. Staley Manufacturing Company. The amount of fructose as a percentage by weight of the saccharides of the entire sweetener system will generally be at least about 42%, and preferably from about 55% to about 60%.

In addition, to crystalline fructose, the sweetener system may also contain crystalline dextrose. Crystalline dextrose is available commercially in the anhydrous or monohydrate crystalline form, the latter being preferred. The crystalline fructose and crystalline dextrose can be mixed with the syrup separately or premixed together before mixing with the syrup.

Without wishing to be bound by any theory (unless expressly noted otherwise), it is thought that the small amount of higher saccharides in high fructose corn syrup and the substantial absence of the same in crystalline fructose (and crystalline dextrose) is responsible for the preparation of cherries that achieve a much higher level of soluble solids in a much shorter period of time, and yet do not exhibit unacceptable shrinkage.

Syrup solids concentration is important to avoid osmotic shock to the fruit, and subsequent shrinking. Experience has shown that a solids differential between the fruit and syrup of 10° Brix or less is safe for yield protection. Therefore, a multi-step process in syrup addition is dictated to achieve a final fruit solids of about 40° Brix (e.g., from about 35° Brix to about 45° Brix) for maraschino cherries and about 70° Brix (e.g., from about 65° Brix to about 75° Brix) for glacé cherries.

A typical process begins with a combination of fruit, water and syrup. The initial ratios of fruit/water/syrup are 1.0/0.03/0.2. This combination is allowed to stand for 24 hours with the liquid phase mechanically recycled over the fruit. At 24 hours, an additional 0.2 parts of syrup are added and the cycle repeated for a total of 5 syrup additions over a 5-day period. The final fruit/-syrup ratio is 1.0/1.0 with a final solids of about 40° Brix for maraschino cherries. The initial amount of water added can be adjusted to control the final solids level.

After syruping, the cherries can be handled conventionally. In such handling, the cherries are typically drained sufficiently dry so that only a minimum of free syrup remains on the fruit. In large operations, syruping tanks are unloaded mechanically into draining trays which are placed in an air-blast dehydrator tunnel at 140° F. The tunnel is equipped with a tank or large pan to collect the syrup. The elevated temperatures and air blast aid in shortening the time necessary to remove the syrup from the fruit surface. The product is ready for retail packaging or storage after the dehydration step.

Where storage is necessary, glacé cherries are held in heavy syrup at room temperature or more preferably at 32° F. Sodium benzoate or sorbic acid is used at the legal limit where there is a possibility of the presence of sugar-tolerant yeasts.

Cherries for maraschino pack are typically leached, dyed, and syruped as for glacé cherries. The syruping process is stopped when about 40% soluble solids are achieved in the fruit. The drained cherries can be sorted, packed into desired containers, covered with new 45% saccharide solution containing maraschino flavoring and sufficient citric acid to lower the pH to 3.6. If a preservative is not used, the containers are closed with a vacuum-closing machine and sterilized by heating until center temperatures reach 185° F. Alternatively, the final syruping can be accomplished in a container suitable for handling at wholesale and/or retain distribution, which container is closed after the final syrup addition.

Cherries for canned fruit salad must contain no sulfur dioxide and have the dye sufficiently set to prevent coloring the adjoining fruit or the syrup. Sulfur dioxide in the leached fruit must be sufficiently low so that it disappears during subsequent processing. The pH of the cherry should be between 4.5 and 5.0. The fruit is added to a water solution of erythrosine (5–7 g/100 lbs. of pitted fruit) and remains there until the desired penetration is achieved. Application of heat accelerates the dye penetration. The dye solution is drained off, the fruit rinsed thoroughly, and then adjusted to a final pH of 3.0–3.4 by boiling in water acidified with citric acid.

The cherries produced by the process of this invention will find utility in conventional applications of maraschino or glacé cherries. As such, they will be used as an ingredient in a variety of foods adding color and flavor thereto, e.g., fruit salad, fruit cake, ice cream, and the like.

FROZEN FRUIT PACKS

The following detailed description will generally describe the frozen fruit packs specifically described in the examples below.

The fruits which may be packed in accordance with these teachings include apples, cherries, strawberries, peaches, dates, pineapple, papaya, banana, nectarines, raspberries, mango, elderberries, loganberries, raising, melons, kiwi (sapota), grapes, plums and others. Any suit which is capable of preservation by conventional freeze packing may be employed.

In general, prior to packing the fruit is processed, i.e., the fruit is de-stemmed, the core is removed and the fruit is washed to yield processed fruit pieces. The skin of the fruit may be perforated by pricking the skin of the fruit, or scarifying the fruit by providing longitudinal or latitudinal slits on the surface of the whole fruit. Alternatively, the fruit pieces may be sliced, partially or entirely peeled, or sectioned into fruit pieces of the desired size, prior to the packing step. However, the steps taken to prepare the fruit for packing may differ as a function of the properties, or ultimate use, of the particular fruit employed, so long as the fruit is maintained as discrete pieces of flesh (as opposed to a puree or separated juice and pulp).

For example, when apples are to be packed, the whole fruit may be washed, peeled and the core removed. The apple is then cut into slices of the desired size. In order to prevent browning of the peeled apple slices upon exposure to air, the apple slices may be soaked in an edible aqueous salt or acid solution, e.g., about 0.1% to about 1% or higher aqueous sodium chloride, ethylenediamine tetracetic acid or ascorbic acid solution.

When peaches are packed, the whole peach is washed, de-stemmed and the core is removed. The peach may then be cut into slices or the entire de-cored peach may be packed. Optionally, the peach skin is peeled away. The skin may be physically pared away with a knife or other conventional peeling device, or the skin or a peach (or other fruit) may be removed by immersing the fruit in an aqueous, about 3% to about 20% and preferably about 5%, caustic solution of sodium or calcium hydroxide. Browning of peeled peaches is prevented by washing the fruit, followed by a bath in about a 1% ascorbic acid solution.

When cherries are employed, they are de-stemmed and the pit is removed prior to packing. Either sweet or sour cherries may be employed, including cherries of the following types: Morello, Montmorency, Queen Ann, Tartarian or Bing cherries.

Prior to packing, strawberries are preferably de-stemmed and the core is removed. The skin of the strawberry may be scarified by providing a group of surface slits in the body of the fruit.

The particulate solid added to the processed fruit is comprised of crystalline fructose. The particulate solid may additionally comprise other edible substances. For example, other edible sugars, starches, and/or starch hydrolyzates, e.g., dextrose, sucrose, maltose, maltodextrin and the like, can be present in the particulate solid. Also, a portion of the fructose in the particulate solid may be in a form not generally recognized as crystalline, e.g., semi-crystalline fructose as described in U.S. Pat. No. 4,517,021 (Schollmeier). However, preferred particulate solids consist solely of crystalline fructose, preferably as beta-fructopyranose in the anhydrous crystalline form.

Crystalline fructose is a hygroscopic crystalline substance and is not to be confused with high fructose corn syrups which generally contain 42% to 90% fructose by weight. Crystalline fructose is an item of commerce, e.g., KRYSTAR® brand crystalline fructose, A. E. Staley Manufacturing Company, Decatur, IL, and can be produced by crystallization from high fructose corn syrup. The particulate solid is generally granular, i.e., the weight average particle size will be between about 100 to about 1000, typically between about 250 to about 500 microns.

Other sweeteners can be used in addition to the particulate solid comprised of crystalline fructose, e.g., corn syrups and/or high fructose corn syrups (typically at 42%. 55% or 90% fructose on a dry solids basis). The use of a particulate solid comprised of crystalline fructose with a corn syrup or high fructose corn syrup will reduce the tendency of the dextrose of the syrup to crystallize in the frozen fruit pack.

The particulate solid and processed fruit are placed in contact before freezing, preferably by conventional techniques, to obtain an admixture of fruit pieces and crystalline fructose. Capping the packed fruit with the particulate solid is contemplated as well as mixing the fruit with the particulate solid. While at least a portion of the fructose added to the fruit pieces is crystalline, it is anticipated that at least a portion of the crystalline fructose of the particulate solid will dissolve in residual wash water adhering to the fruit pieces and/or fruit juice which has seeped from the fruit or has been drawn from the fruit by the hygroscopic crystalline fructose. The amount of particulate solid comprised of crystalline fructose mixed with the fruit pieces should be sufficient to reduce the crystallinity of the fruit pack, i.e., a lowering of the freezing point of the interstitial liquid (the water and/or fruit juice in the interstices between pieces of the fruit and/or container walls) by dissolution therein. The reduction in crystallinity is also enhanced by the reduced tendency for the hygroscopic fructose to recrystallize from the interstitial liquid. The ratio of fruit to particulate solid comprised of crystalline fructose generally ranges from about 4:1 to about 6:1, the precise ratio chosen depending upon the identity of the particulate solid, the type of fruit, and the desired properties of the resulting product.

The particulate solid can be added to the processed fruit by means effective to achieve a relatively uniform distribution of the particulate solid among the processed fruit pieces, e.g., by stirring, agitating, or otherwise mechanically mixing the processed fruit pieces and crystalline fructose. With smaller berries, such as raspberries and the like, the de-stemmed and washed berries are generally crushed in admixture with the particulate solid to obtain a mixture suitable for freeze packing.

Capping the fruit, i.e., placing the fruit in containers and then placing the particulate solid over the fruit as a cap, is also useful.

After contacting, the processed fruit and particulate solid packed in freezer containers of the desired size are frozen. The mixture can be frozen, for example, by conventional cold packing techniques, i.e., storage in cans or barrels in a sharp freezer cold room (e.g., at −23° C.) or conventional quick freezing techniques, i.e., placement in small bags or cartons and quick-frozen, e.g., with a Birdseye multiplate freezer, followed by packaging the smaller containers in larger shipping containers for storage and shipping. The mixture of fruit and particulate solid is generally subjected to an initial freezing temperature of less than about −20° C. and is then held at a temperature of less than about 10° C. during storage, shipping and handling.

The frozen fruit packs are then typically thawed prior to use. The frozen pack is typically kept in cold storage for an extended period, e.g. at least about a month, before use. The thawed fruit is useful in a variety of ways, e.g., as a fruit topping or filling (e.g., pie filling).

The following examples will serve to illustrate this invention and the frozen fruit packs discussed above, but should not be construed as limiting the invention as variations within the scope and spirit of the invention will be apparent to those skilled in the art in possession of this specification. All amounts, parts, ratios, and percentages are by weight unless otherwise indicated in context.

EXAMPLES

Maraschino Type Cherries

Sulfite Brines

The following are representative methods of preparing brine for sulfiting cherries.

EXAMPLE A

Add commercial hydrated lime [$Ca(OH_2)$] to water at the rate of 6 lbs./100 gal. Stir well to form a suspension. Introduce 10.5 lbs. of sulfur dioxide gas into the lime slurry by means of a perforated tube or other submerged bubbling device. The brine will turn nearly clear when the proper amount of sulfur dioxide has been dissolved. The pH of this brine will be about 2.7±0.2.

EXAMPLE B

Add commercial Whitening ($CaCO_3$) to water at the rate of 8 lbs./100 gal. Stir well to form a suspension. Introduce sulfur dioxide gas into the slurry of whiting by means of a perforated stainless steel tube or other submerged bubbling device. Dissolve 10.5 lbs. sulfur dioxide/100 gal. to give a solution containing about 1.25% of sulfur dioxide. During the addition of sulfur dioxide gas, considerable bubbling will usually take place due to the formation of carbonic acid and evolution of carbon dioxide. Loss of sulfur dioxide may be minimized by keeping a floating lid on the surface of the tank in which the brine is made. The brine will turn nearly clear when the proper amount of sulfur dioxide is dissolved. The pH of this brine will be 2.0±0.2.

EXAMPLE C

Add 14 lbs. of anhydrous sodium bisulfite ($NaHSO_3$) or 12.5 lbs. of anhydrous sodium metabisulfite ($Na_2S_2O_5$) to 100 gal. of water with stirring. Add 5 fl. oz. of commercial hydrochloric acid. Add 7 lbs. of commercial anhydrous calcium chloride and adjust the acidity to about pH 3.5 by adding more acid. This brine will contain about 1% sulfur dioxide and 0.85% calcium chloride (or 0.3% calcium ion). The solution may become cloudy and much insoluble material may be precipitated if the ingredients are mixed in a different order than that indicated here.

Leaching of Sulfite

Leaching of sulfite can be accomplished by the typical procedure set forth above.

Syruping of Maraschino Cherries

EXAMPLE 1

Brined and leached whole cherries (with stem) were syruped according to the following procedure. A syrup blend composed of 42% HFCS and crystalline fructose was prepared. This blend has the following typical analysis:

| SYRUP TYPICAL ANALYSIS | |
|---|---|
| Solids, % | 78.3 |
| Moisture, % | 21.7 |
| Carbohydrate Composition | |
| Dextrose, % | 34.0 |
| Fructose, % | 60.6 |
| Maltose, % | 1.0 |
| Isomaltose, % | 1.0 |
| Triose, % | Trace |
| Higher Saccharides | 3.4 |

The above syrup, in an amount of 621 parts by weight (484 parts of dry solids by weight) was mixed with 800 parts by weight of water and 950 parts by weight of the cherries described above. Additional syrup, 862.5 parts by weight of syrup (673 parts of dry solids by weight), was added at 250 minutes and an equal additional amounts at 430 minutes. The soluble solids concentration of the syrup and fruit during infusion are shown in Table 1, below.

TABLE 1

MARASCHINO CHERRY INFUSION

| Time (min.) | Soluble Solids Concentration (° Brix) of: Syrup | Fruit |
|---|---|---|
| 0 | — | — |
| 20 | 26.4 | 4.6 |
| 60 | 25.2 | 12.8 |
| 90 | 25.2 | 11.7 |
| 120 | 25.0 | 12.0 |
| 150 | 24.3 | 11.7 |
| 180 | 24.6 | 12.6 |
| 210 | 24.2 | 13.1 |
| 250 | (syrup addition) | |
| 265 | 40.3 | 24.4 |
| 325 | 40.2 | 22.3 |
| 360 | 39.9 | 20.6 |
| 390 | 39.1 | 23.1 |
| 420 | 39.1 | 22.0 |
| 430 | (syrup addition) | |
| 450 | 49.7 | 25.5 |
| 480 | 49.6 | 28.8 |
| 510 | 49.8 | 29.1 |
| 540 | 49.7 | 30.0 |
| 1375 | 47.6 | 37.8 |
| 1405 | 47.5 | 36.3 |
| 1440 | 48.0 | 38.4 |
| 1500 | 47.8 | 39.5 |

EXAMPLE 2

Syrup as described above, in the amount of 390 parts by weight, was mixed with 220 parts by weight of water and 1000 parts by weight of brined and leached cherries.

The initial ratio of cherry/water/syrup combination was 1.0/0.22/0.39. The theoretical equilibrium of this combination was 22% solids. When the syrup solids approached the equilibrium point, the second step syrup addition was made (just after 4.5 hours for the ambient infusion and just after 3.0 hours for the elevated temperature infusion), comprising 680 parts syrup. This theoretical fine equilibrium was 39%. The final fruit to syrup ratio was 1.0/1.07. (Calculations of theoretical equilibrium assumed an initial solids in the cherries of 5° Brix.)

The infusions were accomplished at two temperatures: ambient (76°-78° F.), and elevated (110° F.) over a nine hour period for the sum of the two syruping steps. The results are shown in Tables 2 and 3, below.

TABLE 2

MARASCHINO CHERRY INFUSION AT AMBIENT TEMPERATURE

| Time (hr.) | Soluble Solids Concentration (° Brix) of: Syrup | Fruit |
|---|---|---|
| 4.5 | 21.6 | 16.9 |
| 5.0 | 44.6 | 25.3 |
| 73.5 | 35.9 | 34.7 |

TABLE 3

MARASCHINO CHERRY INFUSION AT ELEVATED TEMPERATURE

| Time (hr.) | Soluble Solids Concentration (° Brix) of: Syrup | Fruit |
|---|---|---|
| 3.0 | 21.3 | 15.8 |
| 3.5 | 44.2 | 25.7 |
| 73.5 | 36.0 | 35.5 |

It is evident that the elevated temperature experiment achieved a faster infusion rate. The final solids level attained was about 35%, slightly lower than calculated. It is evident that the initial cherry solids were lower than the 5° Brix assumed. Additionally, there was no evidence in the fruit of any shrinkage or shrivelling. As can be seen, a solids differential of 20° to 25° Brix between the fruit and syrup did not cause yield losses. This is due to the faster infusion of monosaccharides into the fruit without the osomotic effects caused by the presence of higher saccharides.

The second step syrup addition was accomplished at about the 5 hour mark at ambient temperature. After this addition, it is conceivable that the final equilibrium can be achieved after packout, rather than in the syruping tank. This approach essentially reduces a conventional 5-day process to about 5 hours.

Syruping of Glacé Cherries

EXAMPLE 3

Brined and leached cherries were syruped at ambient temperature in a manner similar to the maraschino cherries set forth above, except that syrup was removed from the bath just prior to the second and third syrup additions. The initial amounts of fruit and syrup were 100 parts and 39 parts, respectively. Three syrup additions in the amounts shown in Table 4 were made at 6 hours, 30 hours, and 77 hours and syrup was removed in the amounts shown just prior to the syrup additions at 30 hours and 77 hours. The concentration of soluble solids in the syrup and fruit are shown in Table 4.

TABLE 4

GLACE CHERRY INFUSION

| Time (hr.) | Amount of Syrup Removed (pbw) | Amount of Syrup added (pbw) | Soluble Solids Concentration (° Brix) of: Syrup | Fruit |
|---|---|---|---|---|
| 5 | 0 | 0 | 27.9 | 18.6 |
| 6 | 0 | 68 | 51.8 | 19.7 |
| 28 | 0 | 0 | 42.6 | — |
| 30 | 88 | 132 | 62.3 | — |
| 71 | 0 | 0 | 58.3 | 55.6 |
| 77 | 132 | 132 | — | 55.8 |
| 289 | 0 | 0 | 73.6 | 69.5 |

FROZEN FRUIT PACKS

Two separate studies of the use of crystalline fructose in frozen fruit packs are described below. The first study set forth below employed strawberries as the fruit and the second study employed cherries.

FROZEN STRAWBERRY PACKS

EXAMPLE 4

Methods and Materials

The sweeteners used for packing the strawberries were KRYSTAR ® crystalline fructose (available from the A. E. Staley Manufacturing Company), sucrose (Baking Granulated), high fructose corn syrup (HFCS) of 42%, 55%, and 90% d.s.b. fructose (available from the A. E. Staley Manufacturing Company s ISOSWEET ® 100, ISOSWEET ® 5500, ISOSWEET ® 9000, respectively). Fresh strawberries were obtained at retail. The tops and bottoms of the strawberries were removed prior to slicing into quarters.

The fruit pack treatments evaluated are listed in Table 5. The sweetener was uniformly mixed with the fruit in each example, except as noted. Fruit pack ratios were selected so that direct comparison could be made between sucrose and fructose, although the syrups were blended as is and, thus, the stated ratio is fruit to total syrup weight and not just dry solids. Comparisons can also be made with the corn syrups evaluated. A 4:1 crystalline fructose capped fruit pack was also prepared to determine any difference between mixed crystalline fructose and capping with crystalline fructose. The samples were slow frozen at −5° F.

Frozen Fruit Evaluation

The following evaluations were done on the frozen fruit:

Thaw Time
Drained Fruit Weight
% Yield (calculated drained weight/total weight)
Organoleptic Evaluations which included texture, color and flavor Thaw Time was determined by thawing the fruit at room temperature until ice crystals are completely gone throughout the fruit pack.

Drain Fruit Weight was determined by draining the thawed fruit for a specified time and then measuring the weight of the drained fruit. A 66% yield is a good result. The fruit stored for 20 days was drained for 5 minutes as specified in the procedure. The fruit stored for the additional six months was drained for 10 minutes. Percent yield was then calculated based on the resulting drained weight.

Organoleptic Evaluations were from an informal taste panel performed on each treatment by a total of four panelists. The panelists evaluated each of the treatments for color, flavor and texture. These comments are recorded in the observations column of Table 6. The organoleptic evaluations were done on the fruit stored for seven months because there was no apparent differences in the quality of the fruit packs stored for only 20 days.

Results 1. 20 Day Storage—No significant visual and organoleptic differences were noticed. The drained fruit weights did not point out any major differences other than the 4:1 sucrose pack had the lowest drain weight of all the samples. The thaw times did show that the fruit was ready to use more quickly where a 4:1 or 5:1 crystalline fructose or 4:1 sucrose pack was used.

2. 7 Month Storage—At this point in the storage, differences between the treatments became more obvious. Again, the thaw times were different for the different treatments with the 4:1 crystalline fructose being the quickest to thaw at 5.5 hours. The second fastest that time was that of the 4:1 sucrose pack at 6.75 hours. The thaw times of all the samples increased over their 20-day storage times. In all samples, there was more fluid lost from the fruit as determined by lower % yields after 7 months storage except in the crystalline fructose capped treatment. It has a higher % yield.

The organoleptic evaluations also showed differences in the treatments. The 4:1 crystalline fructose fruit pack had the best color, texture and flavor of all the treatments. A number of the treatments, especially the all sucrose and the 42% HFCS samples, exhibited sweetener crystallization during storage which is undesirable. As the sugar crystallizes, water is released which can cause more ice crystal damage to the fruit.

TABLE 5

20 DAY FROZEN FRUIT PACK DATA

| Sample | Drained Fruit Wt. | % Yield | Thaw Time (Hours) |
|---|---|---|---|
| 4:1 Crystalline Fructose (500 g) | 261.50 | 63.37 | 3.5 |
| 5:1 Crystalline Fructose (600 g) | 343.40 | 68.7 | 4.0 |
| 4:1 Sucrose (500 g) | 241.80 | 60.5 | 4.0 |
| 5:1 Sucrose (600 g) | 342.78 | 68.5 | 6.5 |
| 5:1 55% HFCS (600 g syrup wt.) | 348.23 | 69.6 | 6.5 |
| 5:1 90% HFCS (600 g syrup wt.) | 357.87 | 71.6 | 6.5 |
| 5:1 42% HFCS (600 g syrup wt.) | 336.88 | 67.4 | 6.5 |
| 4:1 Crystalline Fructose capped (500 g) | 354.82 | 70.9 | 5.5 |

TABLE 6

7 MONTH FROZEN FRUIT PACK DATA

| Sample | Drained Wt. (gms) | % Yield | Thaw Time (Hours) | Characteristics |
|---|---|---|---|---|
| 4:1 Crystalline Fructose (500 g) | 313.6 | 62.7 | 5.5 | Sweet, natural flavor, color, excellent texture, some fruit collapse |
| 5:1 Crystalline Fructose (600 g) | 347.8 | 57.9 | 7.5 | Soft texture, slightly pale, mushy-pale color |
| 4:1 Sucrose (500 g) | 300.33 | 57.9 | 6.75 | Crystallized sucrose in bottom |
| 5:1 Sucrose (600 g) | 354.6 | 60 | 7.5 | Pale color |
| 5:1 55% HFCS (600 g syrup wt.) | 361.75 | 60.29 | 7.0 | Pale color, shrivelled fruit |
| 5:1 90% HFCS (600 g syrup wt.) | 366.2 | 61 | 7.5 | Color OK-slow thaw |
| 5:1 42% HFCS (600 g syrup wt.) | 370.38 | 61.73 | 7.25 | Dextrose crystallized |
| 4:1 Crystalline Fructose capped | 392.1 | 78.4 | 6.75 | Slightly pale, texture mushy-softer than A |

Discussion

The seven month storage data indicates that there are noticeable differences in the quality of the fruit following storage. The study shows that packed fruit at a ratio of 4:1 performed the best, having the best color, flavor and final texture. The 5:1 pack performed better than the syrups on both the 4:1 and 5:1 sucrose packs. The 4:1 sucrose pack contained crystallized sucrose in the bottom of the container and performed no better than any of the other treatments. It appears that the 90% HFCS sample performed the best of the syrups followed by 55% HFCS and 42% HFCS. The 42% HFCS pack also had crystallized sweeteners in the bottom which makes it somewhat ineffective as a cryoprotectant.

The crystalline fructose capped treatment was an interesting case as it did not show as much yield loss over time and performed significantly better than the other treatments in % yield. Organoleptically, however, it performed comparable to the 5:1 crystalline fructose pack.

Frozen Cherry Packs

EXAMPLE 5

This study was designed to compare the utility of various sweeteners in packing cherries. Crystalline sucrose alone, crystalline fructose alone, high fructose corn syrup alone (at approximately 42% d.s.b. fructose and 70% dry solids, hereinafter 42% HFCS) and various mixtures of each crystalline sugar with 42% HFCS, were contemporaneously evaluated. A set of four individual containers were made up for each of the thirteen formulations shown in Table 7, below. The cherries were U.S.D.A. Grade A taken from a commercial packing line at a point just prior to sweetener capping. Each container of 25 lbs. of cherries was then capped with the sweeteners shown in Table 7. (Formulation No. 13 replicated No. 3, except 0.5% ascorbic acid was added.) The capped packs were then sealed and stored between −10° F. to 0° F. for approximately nine months. The following evaluations were than made.

Ice Crystals Remaining

The frozen packs were removed from storage and held at ambient for twenty-four hours at which time the contents of each was flowable. Each pack was manually examined for remaining ice crystals and subjectively scored on a scale of 0 (no ice crystals remaining) to 5 (large numbers of ice crystals remaining).

Drained Weight

Drained weight was measured by fully thawing the cherries first. Two Volrath stainless steel pans were used to check drain weight. The pans are identical in size and nestable. The upper pan is perforated with holes. This pan is supported approximately 3½ above the other pan while in the nesting position. A full container of cherries was then poured into the perforated pan allowing the juice to be caught by the lower pan. After 5 minutes, the cherries remaining in the upper perforated pan were weighted giving the drained weight.

The results of these evaluations are shown in Table 7, below.

In addition, each pack was graded by two U.S.D.A. Inspectors for color and character. All the packs were graded Grade B, with the exception of those of Formulation Number 4 which were graded Grade C.

It was also noted that crystallized sugar remained in the bottom of the containers of the packs of Formulation Numbers 2–3 and 9–13, but not in Formulation Numbers 1 and 4–8. This indicated that dextrose crystallized from the packs sweetened by 42% HFCS and 42% HFCS in combination with crystalline sucrose, but not from 42% HFCS in combination with crystalline fructose.

TABLE 7

FROZEN CHERRY PACK FORMULATIONS

| Formulation Number | Amount of Sweetener (lbs. of dry solids) Crystalline Fructose | HFCS | Crystalline Sucrose | Ratio of Fruit to Total Sweetener (wt.:wt. dry solids) | Ice Crystals Remaining | Drained Wt. lbs. |
|---|---|---|---|---|---|---|
| 1 | — | — | 5.0 | 5:1 | 3.2 | 13.23 |
| 2 | — | 3.5 | — | 7.14:1 | 2.5 | 13.77 |
| 3 | — | 5.0 | — | 5:1 | 3.0 | 11.87 |
| 4 | 5.0 | — | — | 5:1 | 0.7 | 13.35 |
| 5 | 1.25 | 2.65 | — | 6.41:1 | 2.0 | 13.72 |
| 6 | 1.6 | 3.4 | — | 5:1 | 2.0 | 14.51 |
| 7 | 2.5 | 1.75 | — | 5.88:1 | 1.5 | 14.04 |
| 8 | 2.92 | 2.08 | — | 5:1 | 2.5 | 14.28 |
| 9 | — | 2.65 | 1.25 | 6.41:1 | 2.5 | 14.23 |
| 10 | — | 3.4 | 1.6 | 5:1 | 1.5 | 13.89 |
| 11 | — | 1.75 | 2.5 | 5.88:1 | 2.0 | 13.78 |
| 12 | — | 2.08 | 2.92 | 5:1 | 2.0 | 14.25 |
| 13 | — | 7.0 | — | 5:1 | 2.5 | 13.78 |

What is claimed is:

1. A method of making cherries of the maraschino type comprising:

leaching sulfur compounds from brined cherry fruit with water to lower the residual sulfur dioxide level of said fruit to at most about 100 ppm, immersing said fruit, after said leaching, in a sweetener syrup consisting essentially of a high fructose corn syrup, solids from crystalline fructose and a red coloring agent, wherein said crystalline fructose does not exist in crystalline form in said sweetener syrup, said syrup having a sweetener solids content insufficient to cause substantial osmotic shock to said fruit, and repeating said immersing in at least one more sweetener syrup, said more sweetener syrup (i) consisting essentially of a high fructose corn syrup, solids from crystalline fructose and a red coloring agent, wherein said crystalline fructose does not exist in crystalline form in said sweetener syrup, and (ii) having a higher sweetener solids content than said fruit after said first immersing, the cumulative effect of all said immersions being sufficient to raise the solids level of said fruit and impart thereto a red color.

2. A method of claim 1 wherein said immersions raise the solids level of said fruit to a range of from about 35° Brix to about 45° Brix.

3. A method of claim 1 wherein said immersing raise the solids level of said fruit to a range of from about 65° Brix to about 75° Brix.

4. A method of claim 1 wherein all of said immersions are accomplished in less than about 5 days.

5. A method of claim 1 wherein all of said immersions are accomplished in less than about 2 days.

* * * * *